May 16, 1967 R. W. GUNDLACH 3,320,061
MASKING BY TOTAL INTERNAL REFLECTION FOR
IMAGE REPRODUCTION AND DISPLAY
Filed June 24, 1963 3 Sheets-Sheet 1

INVENTOR.
ROBERT W. GUNDLACH
BY Stanley Z Cole
ATTORNEY

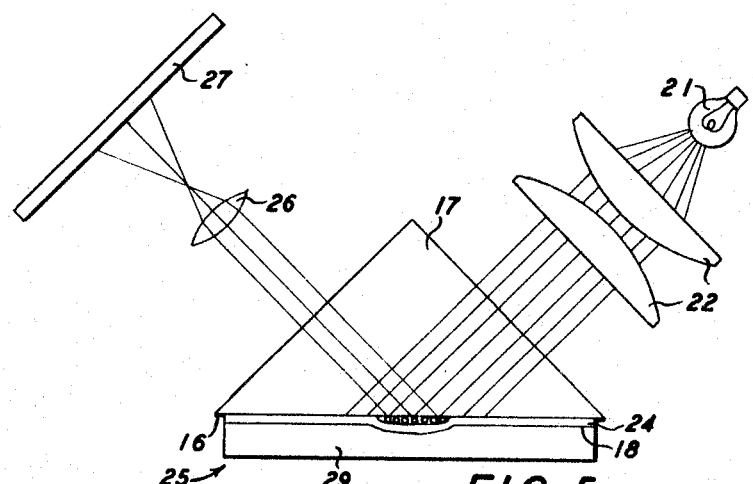
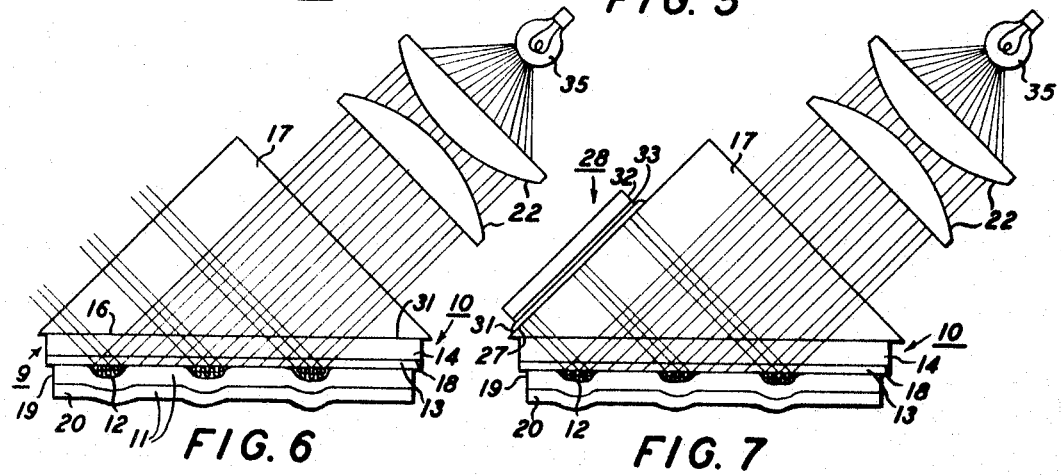
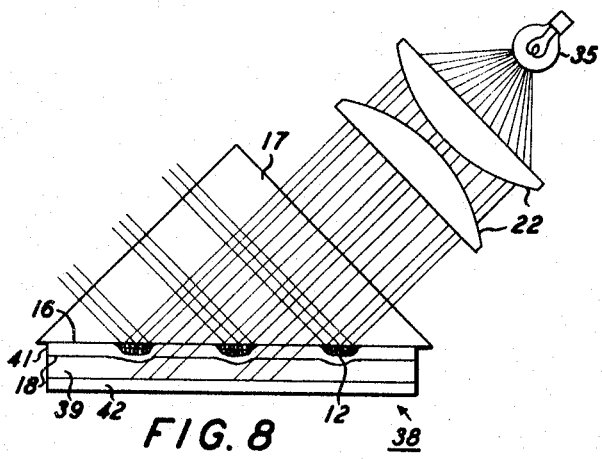
INVENTOR.
ROBERT W. GUNDLACH
BY
*Stanley Z. Cole*
ATTORNEY May 16, 1967

R. W. GUNDLACH 3,320,061

MASKING BY TOTAL INTERNAL REFLECTION FOR
IMAGE REPRODUCTION AND DISPLAY

Filed June 24, 1963

INVENTOR.
ROBERT W. GUNDLACH

BY Stanley B Cole

ATTORNEY

United States Patent Office 3,320,061
Patented May 16, 1967

3,320,061
MASKING BY TOTAL INTERNAL REFLECTION
FOR IMAGE REPRODUCTION AND DISPLAY
Robert W. Gundlach, Victor, N.Y., assignor to Xerox
Corporation, Rochester, N.Y., a corporation of New York
Filed June 24, 1963, Ser. No. 290,089
8 Claims. (Cl. 96—1.4)

This invention relates to the reproduction and display of optical images by xerographically controlled total internal reflection.

The production of visible powder images is well known in the art of xerography. This may be done by forming a latent electrostatic image on an insulating surface and then developing it with finely divided electroscopic powder particles.

The developed image may be projected by transferring it to a sheet of paper or the like and projecting by conventional opaque projection methods, or by transferring it to a sheet of glass or the like and employing a conventional transparency projector. Both of these methods have drawbacks. To achieve even a moderately bright projected image, the transparency method requires a fairly heavy deposit of pigmented particles to provide adequate density for projection systems. The opaque projection method does not readily provide bright images because of inherent optical deficiencies.

Bright optical images may be made according to the present invention even from very thin layers of non-pigmented powder particles. Because large deposits of powder are not required, and transfer of the powder image may be obviated, the present invention is capable of producing images of both high resolution and high contrast.

In one embodiment of the present invention, a mask comprising a flexible light absorbing base, on which a powder image has been formed xerographically, is placed in contact with the reflecting surface of a transparent body. Collimated light directed into the transparent body at an appropriate angle is totally internally reflected where the powder image prevents optical contact between the flexible light absorbing support base and reflecting surface. At areas of contact, however, light is absorbed by the support base. If desired, the reflected beam may be imaged on a viewing screen or the like, or used to selectively expose a light sensitive member including materials such as a diazo film or the like which generally require contact exposure because of their slow speeds.

In another embodiment of the present invention, a light sensitive member may be selectively exposed by the non-reflected light in a manner especially useful, for instance, in the production of transparancies and microfilm copies.

Thus, improved image display and utilization are objects of the present invention. Other objects of the present invention include methods and apparatus for the reproduction of optical images of high contrast and high resolution, bright display of xeerographic images, and the production of transparencies at xerographic processing speeds. These and additional objects of my invention will become apparent from detailed description presented in connection with the accompanying drawings, in which:

FIG. 4 and FIG. 5 illustrate two embodiments for image projection;

FIGS. 6-8 illustrate separate embodiments for selective exposure of light sensitive members;

To more clearly describe the present invention, the phenomena of total internal reflection as applicable to the methods and apparatus herein disclosed will first be explained in connection with FIGS. 1a and 1b.

Figure 1A:
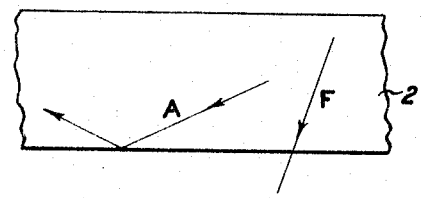
FIGS. 1a and 1b illustrate the optical principles of total internal reflection pertinent to the present invention.

Referring to FIG. 1a, there is shown a block of transparent material 2, such as glass, having a substantially flat lower surface. In accordance with known laws of optics, a ray of light traveling in a generally downward direction in transparent material 2 will be totally reflected at the lower surface thereof provided that the sine of the angle made by the ray with a normal to the lower surface is greater than the ratio of the refractive index of the material below transparent material 2, which is generally air having a refractive index of 1, to the refractive index of the transparent material 2, generally about 1.5. Thus, for a material such as ordinary glass a ray having an angle greater than 42° from a normal to the surface will be totally reflected by the surface whereas rays having a lesser angle will pass through the surface. The smallest angle at which internal reflection occurs is herein referred to as the critical angle. In FIG. 1a, "A" represents a ray which is totally reflected by the surface whereas "F" represents a ray which passes through the surface.

Figure 1B:
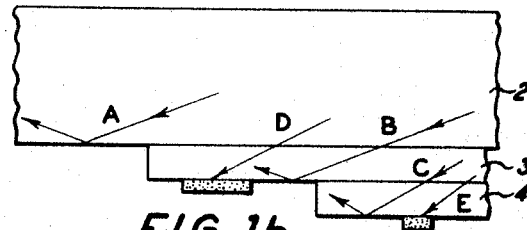

FIG. 1b is similar to FIG. 1a except that transparent layer 3 is placed in intimate contact with the lower surface of transparent material 2 and transparent layer 4 is placed in intimate contact with part of the exposed surface of layer 3. Also, light absorbing material 5 is placed in intimate contact with portions of the exposed surfaces of layers 3 and 4 respectively. It can be shown through the applications of Snell's law, that the critical angle for total internal reflection (as measured in material 2) is exactly the same for the situation of FIG. 1b as for FIG. 1a quite independently of the refractive indices of layers 3 and 4. Accordingly, as shown in FIG. 1b, reflection of A will occur at the interface of material 2 and air; B will be reflected at the interface between layer 3 and air; C will be reflected at the interface between layer 4 and air. However, D and E will be substantially absorbed by material 5 and virtually no reflection will take place.

Figure 2:
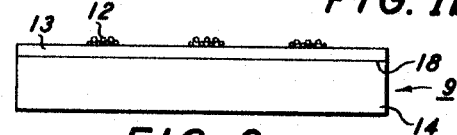
FIG. 2 illustrates a powder image bearing xerographic plate.

FIG. 2 illustrates a xerographic plate 9 bearing powder image 12 suitable for use in the present invention. Plate 9 comprises a photoconductive layer 13 overlying substrate 14. If substrate 14 comprises a material not sufficiently electrically conductive for use in xerographic printing, an additional transparent conductive layer 18, such as tin oxide, is generally incorporated into the structure between layer 13 and substrate 14. Other characteristics of plate 9, including transparency to ultraviolet radiation and flexibility, will depend upon the particular embodiment of the present invention described in this specification.

Powder image 12 conforms to the original document or subject to be copied or displayed and may be formed on plate 9 by any one of a number of methods well known in the art of xerography. For instance, photoconductive layer 13 may be uniformly charged by means of a corona discharge device, and then selectively discharged by exposure to an original pattern of light and shadow. The latent electrostatic image thereby formed may then be made visible in the form of powder image 12 by an appropriate xerographic developing technique such as applying an electrically charged powder to photoconductive layer 13. The powder adheres to either the charged or uncharged portions of photoconductive layer 13 depending upon the electrical polarities applied.

Figure 3A:
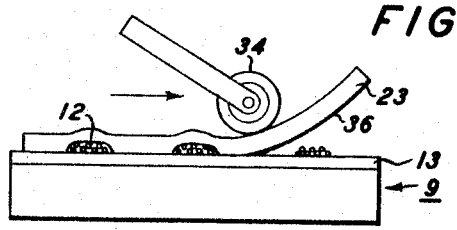
FIG. 3a illustrates transfer of a powder image to a web.
Figure 3B:
FIG. 3b shows a mask for controlling total internal reflection.

FIGS. 3a and 3b illustrate the preferred method of making a mask usable for controlling the reflection from a reflecting body. The xerographic plate used in this embodiment may comprise a photoconductive layer 13 of any of a number of materials as, for example, sulphur, selenium, zinc oxide in a resin binder, or other insulating binder films bearing photoactive pigments, or the like. Substrate 14 may be of aluminum, brass, or the like, or of a non-conductive material, such as glass incorporating a conductive layer 18. Substrate 14 is not limited with respect to flexibility or transparency in this embodiment.

FIG. 3a shows the application of light absorbing web 23 to a powder image bearing support such as xerographic plate 9. Mild pressure is exerted by moving roller 34 across web 23 in the direction of the arrow to effect close contact of surface 36 of web 23, photoconductive layer 13, and powder image 12. Surface 36 of web 23 should, in accordance with this invention, be a tacky or adhesive surface.

FIG. 3b illustrates web 23 after it has been removed from the surface of xerographic plate 9. As shown, the particles comprising powder image 12 adhere to (and may be imbedded in) tacky surface 36 of web 23 in image configuration. This structure comprises mask 10 for use in the present invention.

For purposes of this invention, web 23 may comprise material which is itself non-reflecting. Or, the light absorbing characteristic of web 23 may be provided by a non-reflecting backing of plastic or the like. For example, flexible tape sold as Scotch Brand Electrical Tape #33 has been successfully used in the present invention.

The present invention is not limited to the adhesive method of transferring powder image 12 to web 23. Other transfer techniques, such as those described in U.S. Patents 2,843,499 and 2,855,324 as well as the well-known electrostatic transfer method, may be employed. Thus, there is permitted the use of a wide variety of materials for web 23. These include, but are in no manner limited to plastics, polystyrene-type resins, polyethylenes, Seran, cellulose acetate, and the like.

Figure 4:
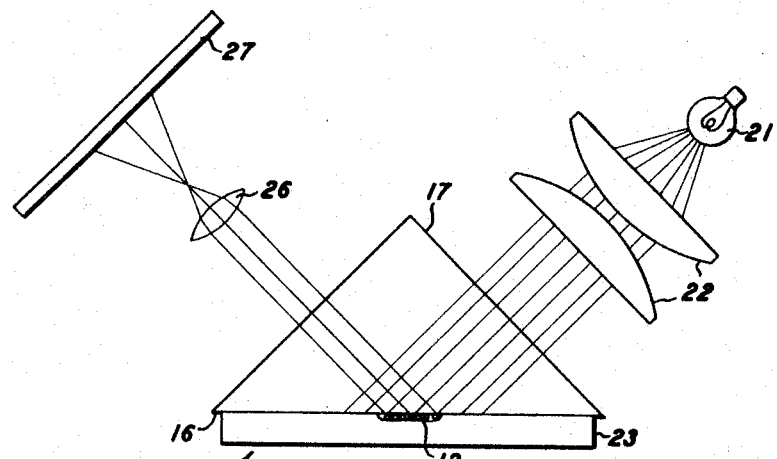

FIG. 4 shows the control of internal reflection from reflecting surface 16 of a transparent block such as prism 17 of, for instance, quartz glass. In the manner shown, the powder-bearing side of mask 10 is pressed against prism 17 so that intimate contact of web 23 with reflecting surface 16 is achieved except where prevented by powder image 12. Condenser 22 directs a collimated beam from light source 21 into prism 17 at an angle greater than the critical angle, and where contact between reflecting surface 16 and light absorbing web 23 is prevented by powder image 12, light will be totally internally reflected and may be focused and projected by projection lens 26 onto viewing screen 27. This embodiment produces at the viewing screen a bright display of an optical image conforming to powder image 12 on a dark field. Since the powder need only selectively prevent contact between surface 16 and web 23, the powder need not be pigmented nor present in thick layers. Even a very thin layer of transparent powder will adequately prevent contact thereby permitting total internal reflection to occur. Thus, high resolution images are attainable by means of the present invention.

Although the preferred method for controlling internal reflection by means of xerographically formed powder images has been described, equivalent embodiments will be obvious to those skilled in the art, and these are also intended to be within the scope of this disclosure. For example, mask 10 need not incorporate an adhesive web. If desired, mask 10 may comprise a non-tacky web to which powder image 12 may be transferred by electrostatic means, or any other means known to the art.

With the appropriate selection of materials, the powder image bearing xerographic plate may itself comprise the mask for controlling internal reflection. This embodiment is shown in FIG. 5.

In FIG. 5, transparent photoconductive layer 24 of xerographic plate 25 comprises an organic photoconductor in a resinous binder. Substrate 29 is preferably flexible and light absorbing. If substrate 29 is an insulator, an electrically conductive layer 18 such as a tin oxide layer is incorporated into the structure of plate 25. Conventional xerographic methods may be used to form powder image 12. Unless plate 25 is sufficiently flexible, layer 24 is then softened as by heating, and plate 25 is pressed against reflecting surface 16 of prism 17 such that optical contact is made except where prevented by powder image 12.

Thus, optical contact between softened layer 24 and reflecting surface 16 is selectively prevented by powder image 12 in the same manner as described in connection with FIG. 4. And, as previously described, light from light source 21 is directed by condenser 22 into prism 17 at an angle greater than the critical angle. Total internal reflection occurs only at the areas of powder image 12. Where there is optical contact between layer 24 and surface 16 light is transmitted rather than reflected, and is absorbed or otherwise dissipated by substrate 29. The totally reflected light may be focused by lens 26 onto receiving plane 27 which may comprise a viewing screen at which there is produced a bright display of an optical image conforming to powder image 12 on a dark field or plane 27 may comprise a light sensitive layer positioned for exposure.

Certain additional applications of powder controlled total internal reflection are explained in connection with FIGS. 6–11. These embodiments of the present invention, which illustrate the light stopping power of even a thin layer of powder, utilize the non-reflected light to selectively expose light sensitive members, such as diazo films.

Strictly for purposes of illustration, the embodiments of FIGS. 6–11 are described in terms of their particular application to the well-known diazo printing process. Nevertheless, the present invention may also be used with other processes utilizing light sensitive media, such as photography, white-printing, xerography and the like. The diazo process enjoys extensive commercial use, and suitably typifies the broad scope of the present invention.

In FIG. 6, mask 10 comprises powder image 12 on xerographic plate 9. Since plate 9 must be transparent in this embodiment, it may suitably comprise an organic photoconductor in a polyethylene binder overlying Mylar polyester film produced by E. I. du Pont de Nemours & Co., Inc., Wilmington, Del., or the like.

To carry out the present invention, conventional xerographic imaging procedures are used to cause powder to adhere to photoconductive layer 13. Power image 12 corresponds to the areas of copy web 11 that are to be shielded from actinic radiation.

Mask 10 is positioned (as shown in FIG. 6) with substrate 14 in optical contact with reflecting surface 16 of prism 17. Optical contact may be assured by means of oil film 31 of, for instance, mineral oil. Copy web 11, comprising diazo layer 19 and flexible substrate 20, is pressed against photoconductive layer 13 of plate 9. Contact of the two surfaces is thereby achieved, except where web 11 deforms under displacement by powder image 12.

With the elements so positioned, condenser 22 directs actinic radiation (which in diazo systems is typically ultraviolet light) from light source 35 toward reflecting surface 16 at an angle greater than the critical angle as explained above. Since plate 9 is transparent, those areas of diazo layer 19 in contact with photoconductive layer 13 will be exposed to actinic radiation. However, in accordance with the optical principle explained above, exposure will be prevented where diazo layer 19 is held out of contact with photoconductive layer 13, because of the occurrence of total internal reflection. Thus, diazo layer 19 will be masked in these areas and remain unexposed.

After the foregoing exposure to actinic radiation, the image on copy web 11 may be made visible by any conventional developing method, such as immersion in ammonia vapor.

A "negative" (in the photographic sense) of the image formed on diazo layer 19 of FIG. 6 may be made simultaneously as shown in FIG. 7.

FIG. 7 comprises the elements of FIG. 6 plus additional elements for the selective exposure of a second light sensitive member. In FIG. 7, conventional diazo coated copy member 28, comprising diazo layer 32 and transparent substrate 33, is positioned to intercept the light reflected at powder image 12. This is conveniently done by placing substrate 33 of copy member 28 in optical contact (by means of oil film 31) with the third surface 27 of triangular prism 17. After exposure of diazo layer 32 to the totally internally reflected light, the latent image thus formed may be made visible by an appropriate diazo developing process.

FIG. 8 shows an embodiment of the present invention adapted for use with a member combining the properties of mask 10 and copy web 11 of FIG. 6. In FIG. 8, copy member 38 comprises flexible transparent substrate 39, one side of which is coated with an electrically conductive material, as copper iodide, forming layer 18, and a transparent photoconductive layer such as organic photoconductor in a thermoplastic binder to form photoconductive layer 41. The second side of transparent substrate 39 is coated with diazo material to form diazo layer 42. Xerographic methods are again used to form powder image 12 conforming to an original to be copied on photoconductive layer 41 of copy member 38.

Copy member 38, bearing powder image 12, is then placed in optical contact with reflecting surface 16 of prism 17 by heat softening thermoplastic photoconductive layer 41 and pressing it in contact with reflecting surface 16. Optical contact is thereby achieved except where prevented by powder image 12.

Thus, in FIG. 8, powder image 12 selectively prevents contact between softened photoconductive layer 41 and reflecting surface 16 in the same manner it was shown to prevent contact between photoconductive layer 13 and diazo layer 19 in FIG. 6. Again, it is seen that light directed into prism 17 at an angle greater than the critical angle, will impinge on diazo layer 42 except in those areas corresponding to powder image 12. As explained above, total internal reflection will occur in the areas of powder image 12, and prevent exposure of diazo layer 42.

After exposure, diazo layer 42 may be developed with ammonia vapor or by other suitable techniques. Copy member 38 is suitable for use as a projection transparency for viewing the image thereon, or for making additional copies by projection or contact printing on light sensitive materials.

Figures 9, 10:
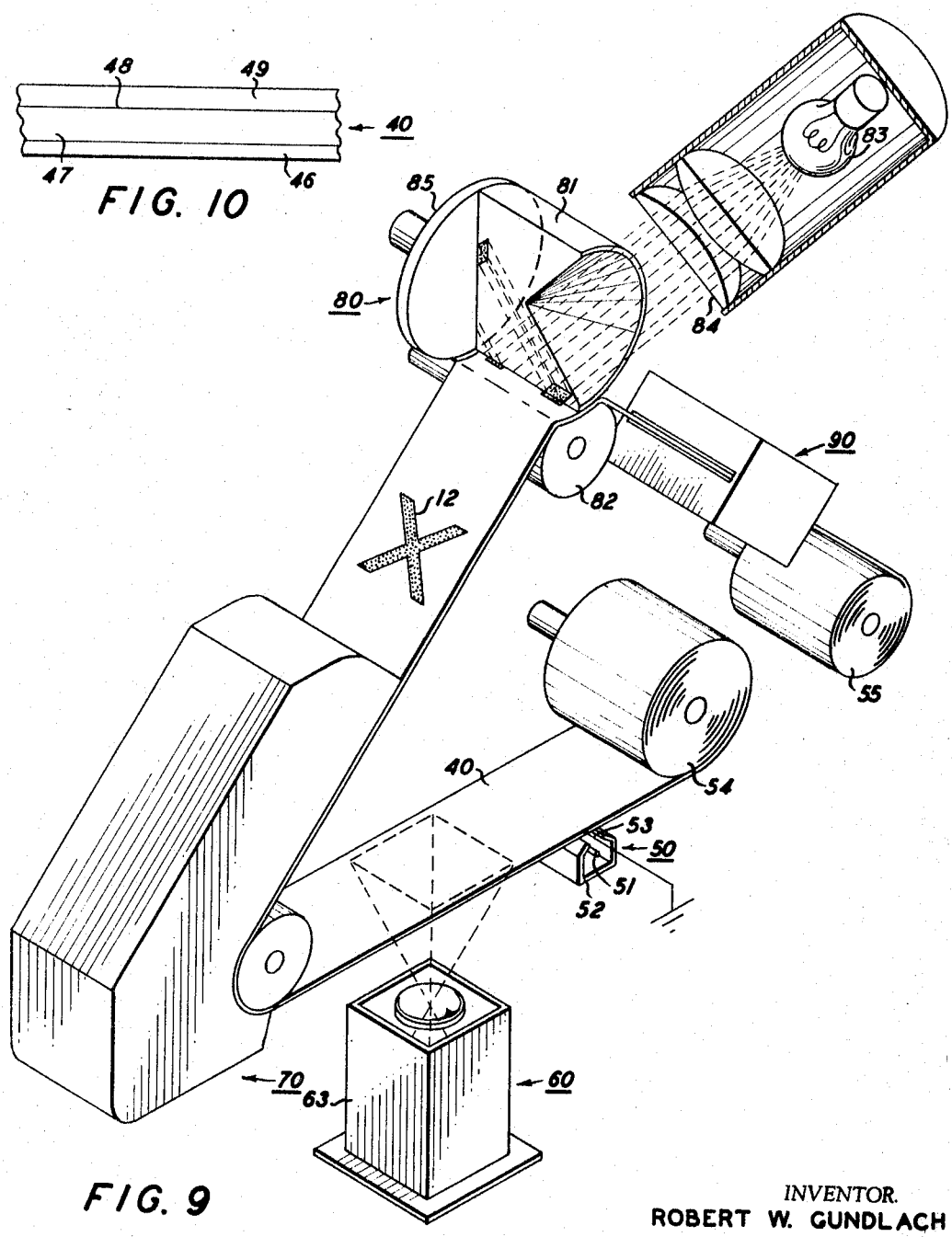
FIG. 9 illustrates continuous copying apparatus according to this inventon; and, FIG. 10 illustrates an image web for use in the continuous copying mode of this invention.

FIG. 9 illustrates methods and apparatus for repetitive recording of copies according to the present invention. As shown more clearly in FIG. 10, copy web 40 for repetitive recording is similar in composition to member 38 of FIG. 8. That is, web 40 comprises: flexible transparent substrate 47 of polyester resin, cellulose acetate or other suitable transparent flexible material; transparent conductive layer 48 of copper iodide, or the like; transparent photoconductive layer 49 of, for instance, an organic photoconductor in a thermoplastic binder; and diazo layer 46.

Referring again to FIG. 9, successive portions of copy web 40 are fed from supply roller 54 and pass through various processing stations in traveling toward take-up roller 55. These stations are, respectively, a xerographic charging station 50, a xerographic exposure station 60, a xerographic developing station 70, a diazo exposure station 80 and a diazo developing station 90.

Xerographic charging station 50 (schematically shown as a corotron) may comprise one or more fine conductive strands 51 partly surrounded by conductive shield 52. Conductive strands 51 are raised to a sufficiently high electrical potential by a power source (not shown) to cause corona discharge, and the resultant deposition of a uniform electrostatic charge on the surface of image photoconductive layer 49 as it moves past slit 53 of shield 52. As shown, conductive layer 48 is preferably electrically grounded at charging station 50.

Uniformly charged portions of copy web 40 are then exposed to a pattern of light and shadow by optical image system 63 at xerographic exposure station 60. This exposure step selectively discharges web 40, thereby producing a latent electrostatic image which is made visible at xerographic developing station 70 where finely divided oppositely charged powder particles are cascaded across the surface of photoconductive layer 49. The charged powder is attracted by, and adheres to, the charged areas thereby forming a visible powder image designated by reference numeral 12. Other developing methods such as brush development, powder cloud development, and the like, are well-known in the art of xerography and may be used instead of cascade development. Cascade is preferred, however, especially in the formation of miniature copies, because of the high degree of image resolution attainable thereby. Powder image 12 need not be permanently fixed to the surface of copy web 40. The image bearing portion of copy web 40 may proceed to the diazo exposure station without any additional intermediate processing steps.

At diazo exposure station 80, copy web 40 bearing powder image 12 passes between quartz roller 81, shown cut-away only for clarity, and backing roller 82. Backing roller 82 preferably comprises a soft rubber or other spongy material so that it will be deformed easily by the mild pressure of quartz roller 81. This deformation of backing roller 82 produces a wider area of contact between copy web 40 and quartz roller 81, and the mild pressure exerted by roller 81 maintains intimate contact of the members except where contact is prevented by powder image 12. Light from ultraviolet light source 83 is directed toward the aforesaid contact area by means of condensing system 84, resulting in the selective exposure of diazo layer 46.

As shown in FIG. 9, a cone shaped indentation enables quartz roller 81 to function in the manner of the prism designated by reference numeral 17 in FIGS. 2–8. Thus, collimated ultraviolet light is projected onto the contact areas of copy web 40 and quartz roller 81, and is totally internally reflected in the areas where contact is prevented by powder image 12. Internally reflected rays are absorbed by light absorbing material 85 coated on the end of roller 81.

The exposed copy web 40 then passes through diazo developing station 90 where diazo layer 46 is exposed to ammonia vapor. A visible image is thereby produced on copy web 40 which then collects on take-up roller 55.

Copies made according to the present invention on transparent material may be used for projection viewing, production of additional copies, and other suitable applications. Because of their small size, microfilm copies made according to the present image may be conveniently stored until such time as the information contained thereon is needed. Readable prints may then be made by xerography, photography, and like processes.

In the various embodiments of the present invention, the effective light stopping power of powder image 12 results from its ability to selectively prevent optical contact between surfaces of particular members. Accordingly, the powder used in forming powder image 12 need not be pigmented. Similarly, since permanence of powder image 12 is not required for controlling total internal reflection according to the present invention, powder image 12 need not be subjected to a fixing step, as often required in xerography.

The specific embodiments described in this application are presented for purposes of description and illustration rather than limitation. Accordingly, it is intended that the following claims be interpreted broadly to give full scope to the present invention.

What is claimed is:
1. The method of producing an image comprising:
   (a) forming a transferable powder image;
   (b) transferring said powder image to a non-reflecting web;
   (c) presenting said non-reflecting web bearing said powder image to a reflecting surface of a transparent body, whereby optical contact is made between said reflecting surface and said web except where prevented by said powder image;
   (d) directing collimated light into said body toward said reflecting surface at an angle within the range for total internal reflection at said reflecting surface where contact between said reflecting surface and said web is prevented by said powder image; and,
   (e) imaging light totally internally reflected from said reflecting surface at a receiving plane.
2. Method for reproducing an optical image according to claim 1, wherein said powder image comprises non-pigmented resinous particles.
3. The method of claim 1, wherein said powder image is formed on a xerographic plate and is transferred from said plate to said web by presenting the adhesive surface of said web to the powder image-bearing plate under mild pressure and separating said web from said plate.
4. The method for producing an image comprising:
   (a) presenting a powder image bearing non reflecting support member to a reflecting surface of a transparent prism whereby said support member is in intimate contact with said reflecting surface except where contact is prevented by said powder image;
   (b) directing a collimated beam of light into said transparent prism and toward said reflecting surface at an angle within the range of total internal reflection at said reflecting surface where contact between said reflecting surface and said non-reflecting support member is prevented by said powder image; and,
   (c) imaging the actinic radiation totally internally reflected from said reflecting surface at a receiving plane.
5. The method of exposing a copy member to an actinic radiation pattern, said copy member comprising a transparent photoconductive layer overlying one side of a transparent flexible support web and an actinic radiation sensitive layer overlying a second side of said web, comprising:
   (a) forming a xerographic powder image on said photoconductive layer;
   (b) positioning said photoconductive layer in intimate contact with the reflecting surface of a transparent body except where contact is prevented by said xerographic image; and,
   (c) directing a beam of actinic radiation into said transparent body and toward said reflecting surface at an angle within the range for total internal reflection at said reflecting surface where contact between said reflecting surface and said transparent photoconductive layer is prevented by said powder image, whereby total internal reflection selectively prevents exposure of said actinic radiation sensitive layer.
6. The method of reproducing a copy from an optical image comprising:
   (a) xerographically forming a powder image on a xerographic plate conforming to said optical image;
   (b) positioning the powder image bearing surface of said plate in optical contact with the reflecting surface of a transparent body except where optical contact is prevented by said powder image and positioning a light sensitive member in optical contact with the other side of said plate;
   (c) while said plate, prism and member are positioned as aforesaid, directing collimated light into said prism at an angle within the range for total internal reflection at said reflecting surface where contact between said reflecting surface and said plate is prevented by said powder image; and
   (d) developing the image thereby formed on said light sensitive member.
7. The method of reproducing an optical image comprising:
   (a) forming a powder image on a flexible light absorbing web;
   (b) presenting said web bearing said powder image to the reflecting surface of a transparent body under mild pressure, whereby optical contact is made between said web and said reflecting surface except where prevented by said powder image;
   (c) directing collimated light into said transparent body at an angle within the range for total internal reflection at said reflecting surface where contact between said reflecting surface and said web is prevented by said powder image; and
   (d) imaging light totally internally reflected from said reflecting surface on a viewing screen.
8. The method of selectively exposing a copy web comprising a transparent flexible support member one side of which is coated with a first layer comprising photoconductive material in a resinous binder and the opposite surface of which is coated with a second layer comprising light sensitive material comprising:
   (a) forming a xerographic powder image on said first layer;
   (b) positioning said first layer in intimate contact with the surface of a transparent body except where contact is prevented by said xerographic powder image; and,
   (c) directing a beam of light into said transparent body and toward said surface of said transparent body at an angle within the range for total internal reflection at said surface where contact between said surface and said first layer is prevented by said powder image whereby said light is reflected only at those areas corresponding to said powder image and is transmitted only in those areas of intimate contact between said surface and said photoconductive layer.

References Cited by the Examiner

UNITED STATES PATENTS

| | | | |
|---|---|---|---|
| 2,050,486 | 8/1936 | Davis et al. | 88—14 |
| 2,685,227 | 8/1954 | Brietzke | 88—26 |
| 2,773,768 | 12/1956 | Sanders et al. | 96—75 |
| 2,951,443 | 9/1960 | Byrne | 96—1 X |
| 3,138,059 | 6/1964 | White | 95—1.1 |
| 3,174,414 | 3/1965 | Myer | 95—1.1 |

NORMAN G. TORCHIN, *Primary Examiner.*

D. PRICE, R. MARTIN, *Assistant Examiners.*